United States Patent [19]

Bujak, Jr.

[11] Patent Number: 5,520,328
[45] Date of Patent: May 28, 1996

[54] SYSTEM FOR PROVIDING INTEGRATED ZONE INDOOR AIR QUALITY CONTROL

[75] Inventor: Walter E. Bujak, Jr., Suffield, Conn.

[73] Assignee: Carrier Corporation, Syracuse, N.Y.

[21] Appl. No.: 334,259

[22] Filed: Nov. 3, 1994

[51] Int. Cl.⁶ .............................. F25B 29/00; F24F 11/00
[52] U.S. Cl. ....................... 236/44 A; 165/16; 236/49.3; 454/239
[58] Field of Search .............................. 165/16; 236/49.3, 236/44 A; 454/236, 239, 256

[56] References Cited

U.S. PATENT DOCUMENTS 4,407,185 10/1983 Haines et al. ........................ 165/16 X
5,353,862 10/1994 Akiyama et al. .................... 236/44 A

OTHER PUBLICATIONS

"If The Ins and Outs of IAQ Take Your Breath Away, We've Got Some Answers to Help You", Ashrae Journal's Office Product and Show Guide, Jan. 1995.

Primary Examiner—William E. Wayner

[57] ABSTRACT

A system for providing air quality control for an indoor area divided into a plurality of zones, whereby air quality is controlled both centrally and at each of the zones, including a central controller, a central damper, a supply air stream duct, a return air duct, a plurality of zone controllers, a plurality of zone dampers, a plurality of air quality sensors (i.e., $CO_2$, volatile organic compounds, humidity, etc. . . ) and a plurality of temperature sensors. A method for providing air quality control for an indoor area divided into a plurality of zones, whereby air quality is controlled both centrally and at each of the zones, including the steps of: reading an output value of an air quality sensor from one of the zones, comparing the output value with a zone maximum threshold value and a zone minimum threshold value, modulating the zone damper to vary a supply air flow into the zone, repeating the first three steps for each zone, determining a predetermined function (i.e., average, maximum, minimum, etc. . . ) of the output values from all of the zones, comparing the function of the output values with a central maximum threshold value and a central minimum threshold value, and modulating the central damper to vary the flow of outside air into the supply air stream.

15 Claims, 8 Drawing Sheets

SYSTEM FOR PROVIDING INTEGRATED ZONE INDOOR AIR QUALITY CONTROL

BACKGROUND OF THE INVENTION

1. Field of the Invention

This invention relates generally to air conditioning systems and more particularly to an air quality control system for an indoor area divided into a plurality of zones.

2. Discussion of the Prior Art

Presently, air quality control systems monitor air quality levels at each zone and regulate conditioned air at the zone level only. This simple control method is functional but is not always efficient. For instance, when a temperature sensor indicates that a room (i.e., zone) temperature is too low, a room damper will close to slow a flow of cool conditioned air into a room and allow the room temperature to rise. On the other hand, when the air quality in the room deteriorates below a threshold level, the room damper is opened further to allow more fresh conditioned air into the room. This method has an inherent conflict when there is a simultaneous low temperature and poor air quality condition because the damper is closed to raise the temperature, however, the air quality continues to deteriorate until the damper is opened to allow more fresh conditioned air into the room. It is desirable to have an air quality control system that allows for efficient operation during the simultaneous condition of low temperature and poor air quality.

OBJECTS AND SUMMARY OF THE INVENTION

It is therefore an object of the present invention to provide an improved system for controlling the air quality in an indoor area divided into a plurality of zones.

It is a further object of the present invention to provide said improved system wherein air quality is controlled both centrally and at each of the zones.

It is a still further object of the present invention to provide an efficient method for controlling the air quality when there is a simultaneous need for higher zone temperature and better zone air quality.

These and other objects of the present invention are attained by providing an air quality control system that includes: a central controller, a central damper, a supply air stream duct, a return air duct, a plurality of zone controllers, a plurality of zone dampers, a plurality of air quality sensors, and a plurality of temperature sensors. The central controller provides air quality control of a supply air stream which flows to the zones. The central damper is modulated by the central controller for regulating a mixture of outside air and return air into the supply air stream. The supply air stream duct provides a plurality of interconnected supply channels through which the supply air flows to the zones. The return air duct provides a plurality of interconnected return channels through which the return air from each zone recirculates. The plurality of zone controllers, each in communication with the central controller, provide air quality control for the plurality of zones. The plurality of zone dampers are each appended to one of the supply channels and modulated by the associated zone controller for individually regulating the flow of supply air into each zone. The plurality of air quality sensors, one located in each zone and each continuously monitored by the associated zone controller, provide an air quality output value for each zone. The plurality of temperature sensors, one located in each zone and each continuously monitored by the associated zone controller, provide a zone temperature for each zone.

It is a further aspect of the present invention to provide a method of air quality control including the steps of: reading the output value of the air quality sensor from one of the zones; comparing the output value with a zone maximum threshold value and a zone minimum threshold value; modulating one of the plurality of zone dampers for increasing the supply air flow into the one zone when the output value is greater than the zone maximum threshold; modulating one of the plurality of zone dampers for decreasing the supply air flow into the one zone when the output value is less than the zone minimum threshold; repeating said steps of reading the output value, comparing the output value, and modulating the zone damper for each of the zones; determining a predetermined function of the output values from all of the zones; comparing the function of the output values with a central maximum threshold value and a central minimum threshold value; modulating the central damper for increasing an outside air flow into the supply air stream when the function of the output values is greater than the central maximum threshold value; and modulating the central damper for decreasing an outside air flow into the supply air stream when the function of the output values is less than the central minimum threshold value.

It is a still further aspect of the present invention to provide said method of air quality control, wherein the step of modulating one of the zone dampers is performed for decreasing the supply air flow into the one zone when the zone temperature is below a zone minimum temperature threshold value; and the step of modulating the central damper is performed for increasing the flow of outside air into the supply air stream when the zone temperature is below the zone minimum temperature threshold value and the output value of the air quality sensor is greater than the zone maximum threshold value. Additionally, the step of modulating one of the zone dampers is performed for increasing the supply air flow into the one zone when the zone temperature is above a zone maximum temperature threshold value; and the step of modulating the central damper is performed for decreasing the flow of outside air into the supply air stream when the zone temperature is above the zone maximum temperature threshold value and the output value of the air quality sensor is less than the zone minimum threshold value.

It is another aspect of the present invention to provide for the following variations to said system and said method. The predetermined function of the output values is a maximum of the output values. The predetermined function of the output values is an average of the output values. The air quality sensor is a $CO_2$ sensor. The air quality sensor is a volatile organic compound sensor.

It is still another aspect of the present invention to provide said system, wherein the air quality sensor is a humidity sensor and said system further comprises: a central humidifier and a central dehumidifier. The central humidifier and the central dehumidifier are controlled by the central controller for regulating a humidity of the supply air stream.

It is yet another aspect of the present invention to provide a method of humidity control including the steps of: reading an output value of the humidity sensor from one of the zones; comparing the output value with a zone minimum threshold value and a zone maximum threshold value; modulating one of the plurality of zone dampers for increasing the supply air flow into the one zone when the output value is greater than the zone maximum threshold value; modulating one of the plurality of zone dampers for decreasing the supply air flow into the one zone when the output value is less than the minimum threshold value; repeating the steps of reading the output value, comparing the output value, and modulating the zone damper for each of the zones; determining a predetermined function of the output values from all of the zones; comparing the function of the output values with a central minimum threshold value and a central maximum threshold value; regulating a central humidifier for increasing the humidity of the supply air stream when the function of the output values is less than the central minimum threshold value; and regulating a central dehumidifier for decreasing the humidity of the supply air stream when the function of the output values is greater than the central maximum threshold value. Furthermore, the predetermined function may include one of the following: the minimum of the output values, the maximum of the output values, or the average of the output values.

BRIEF DESCRIPTION OF THE DRAWINGS

For a better understanding of these and other objects of the present invention, reference will be made to the following detailed description of the invention, which is to be read in association with the accompanying drawings, wherein.

DETAILED DESCRIPTION OF THE INVENTION

Figure 1:
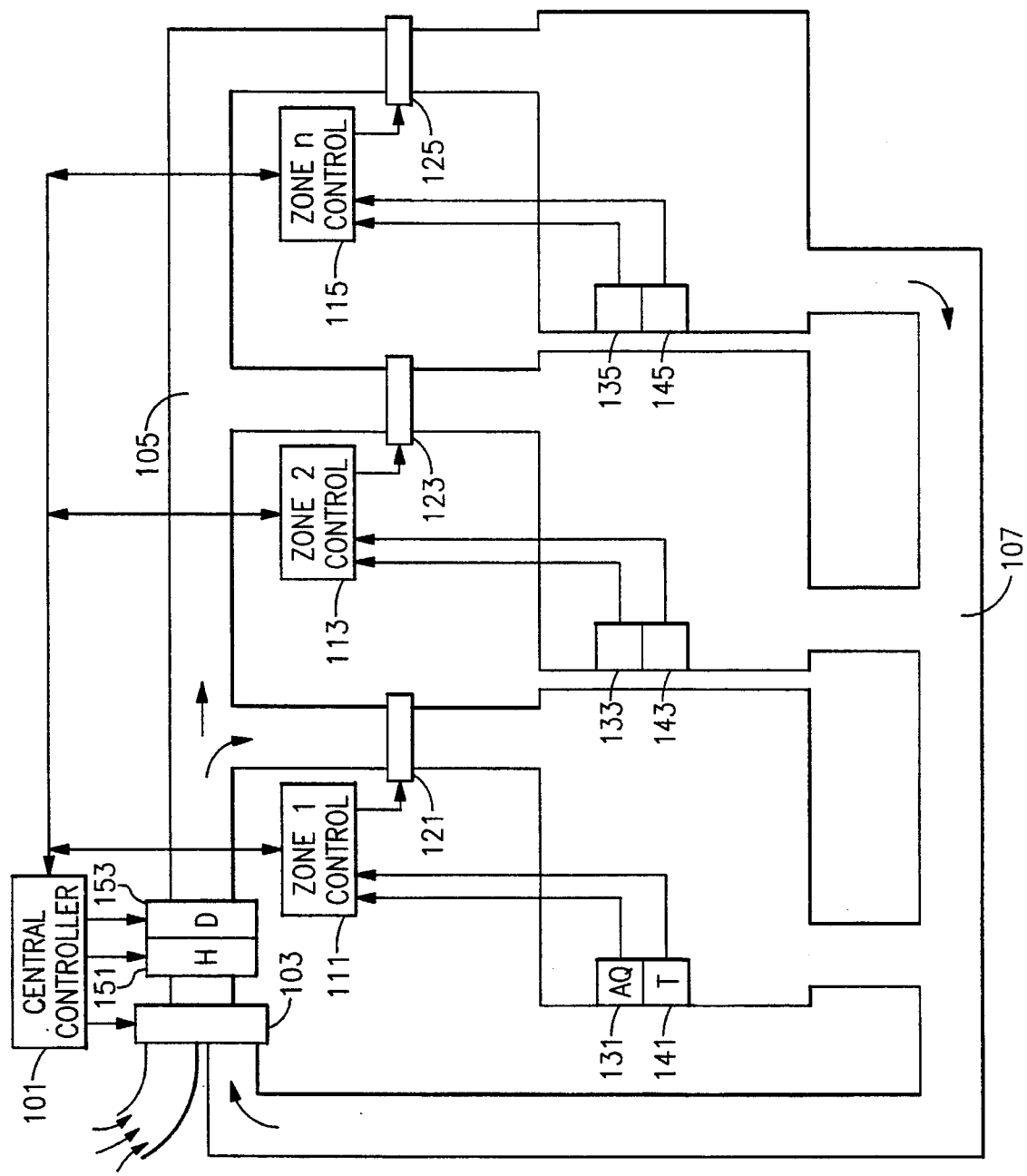
FIG. 1 is a system block diagram.
Figure 2A:
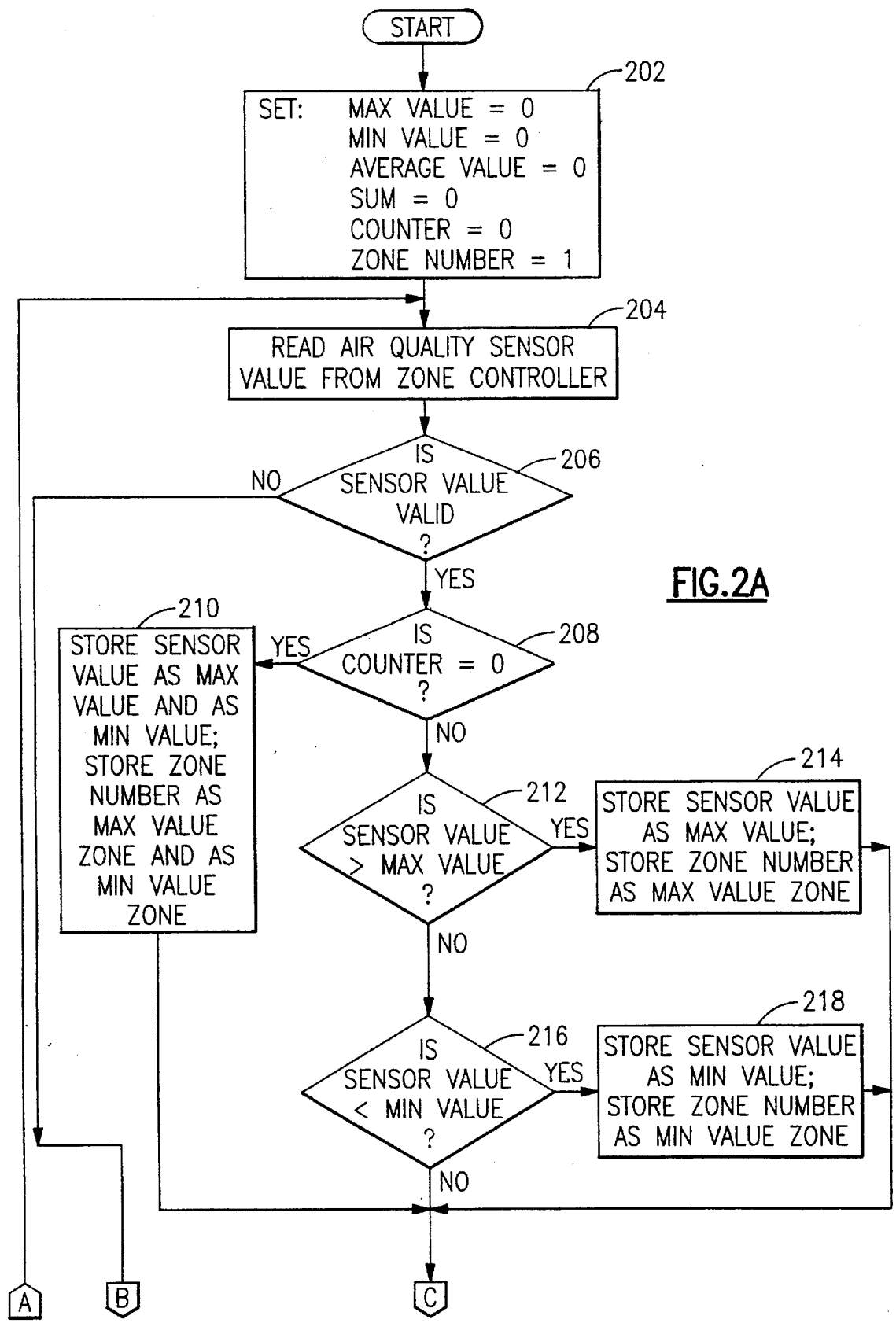
FIGS. 2A–2G comprise a system flowchart of the operation of the central controller in communication with the plurality of zone controllers.
Figure 2B:
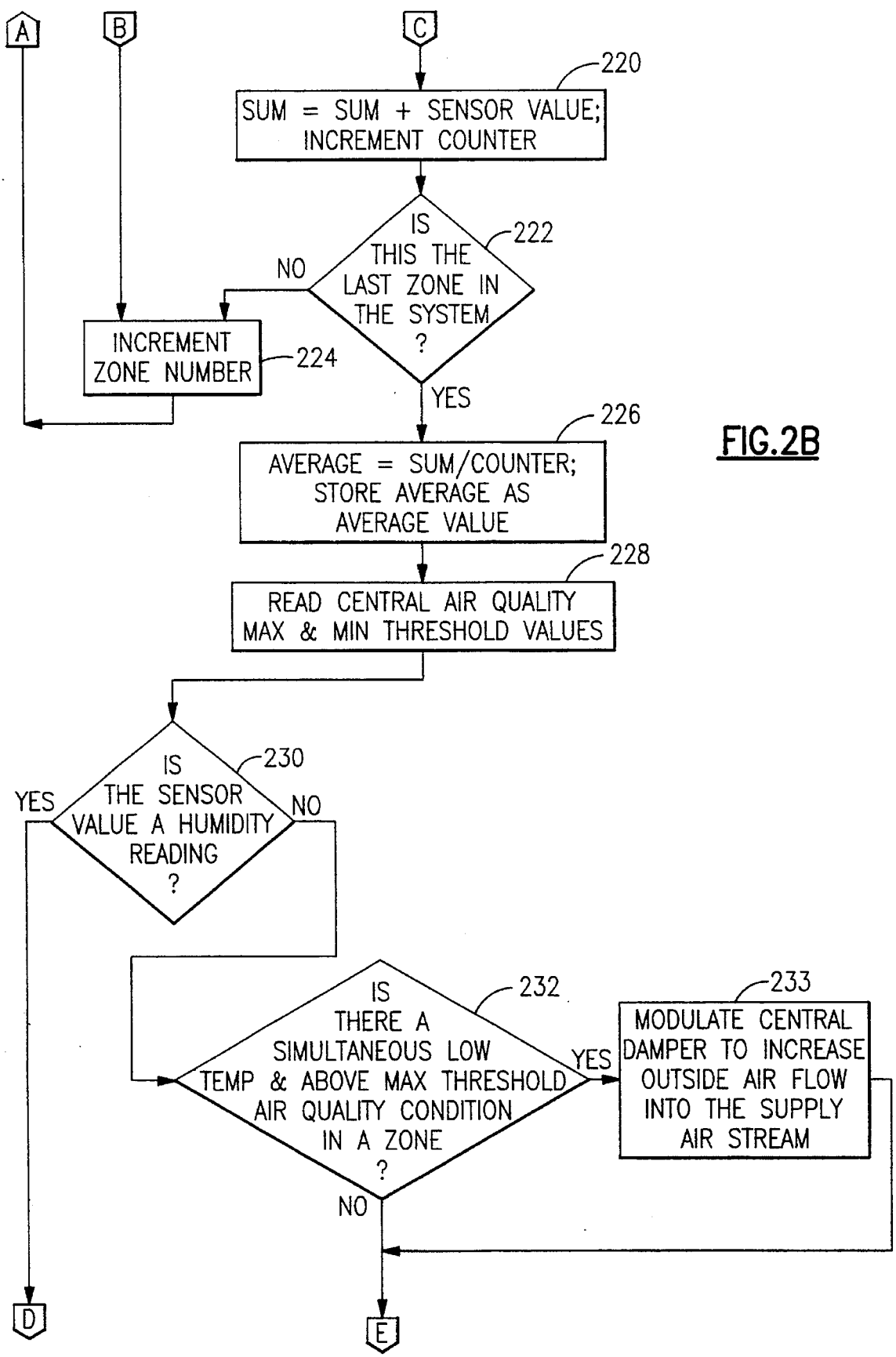
Figure 2C:
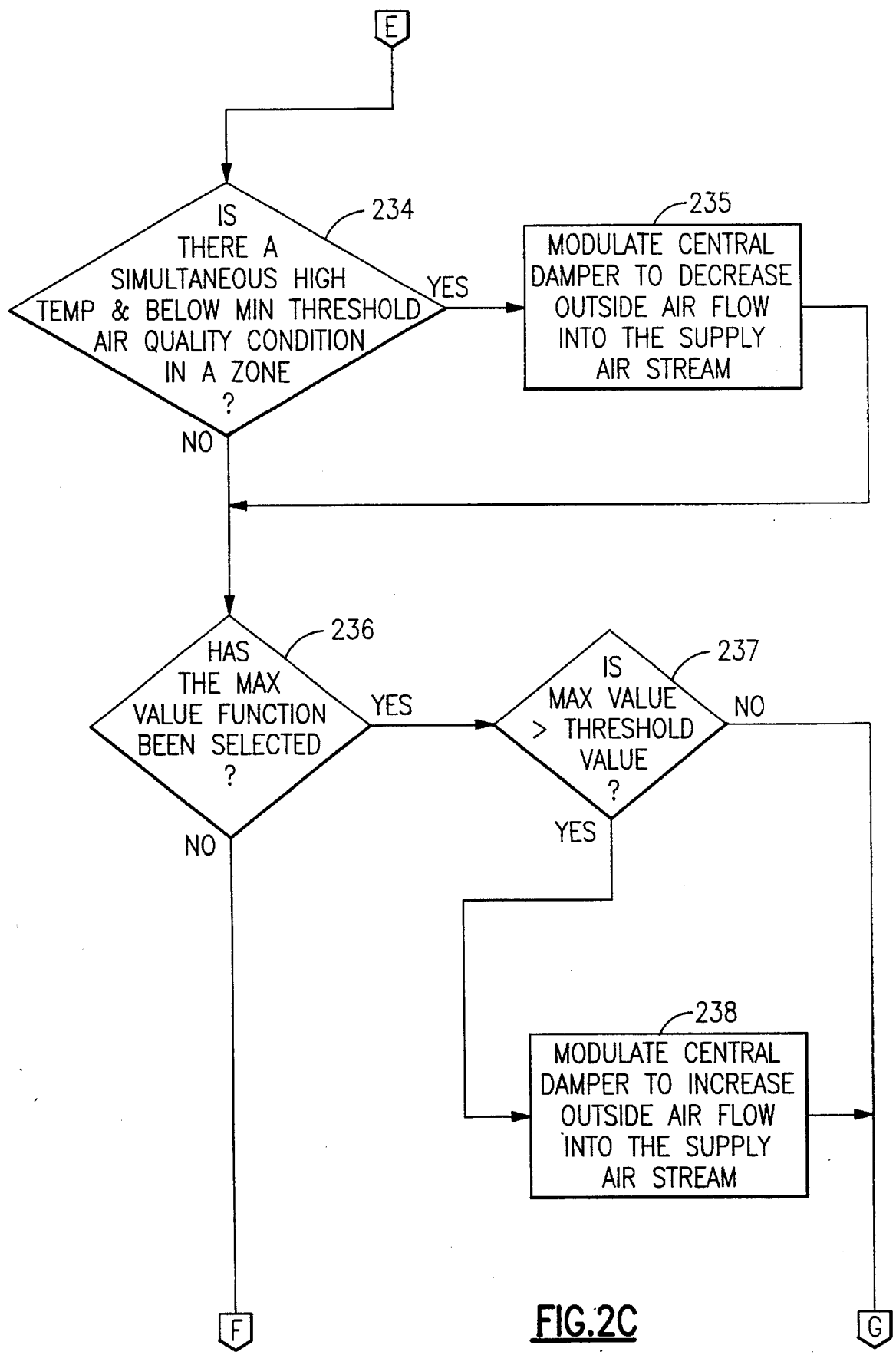
Figure 2D:
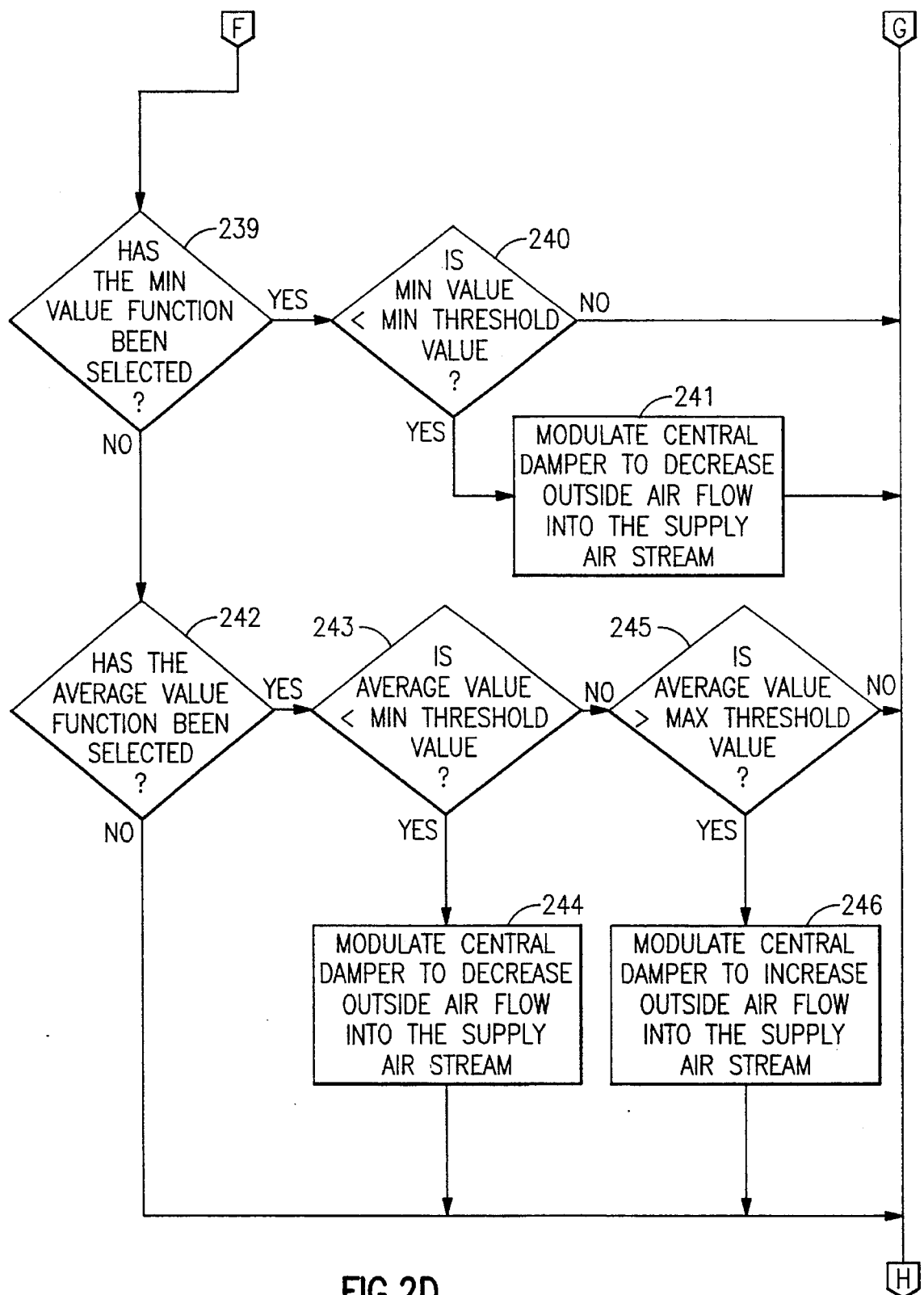
Figure 2E:
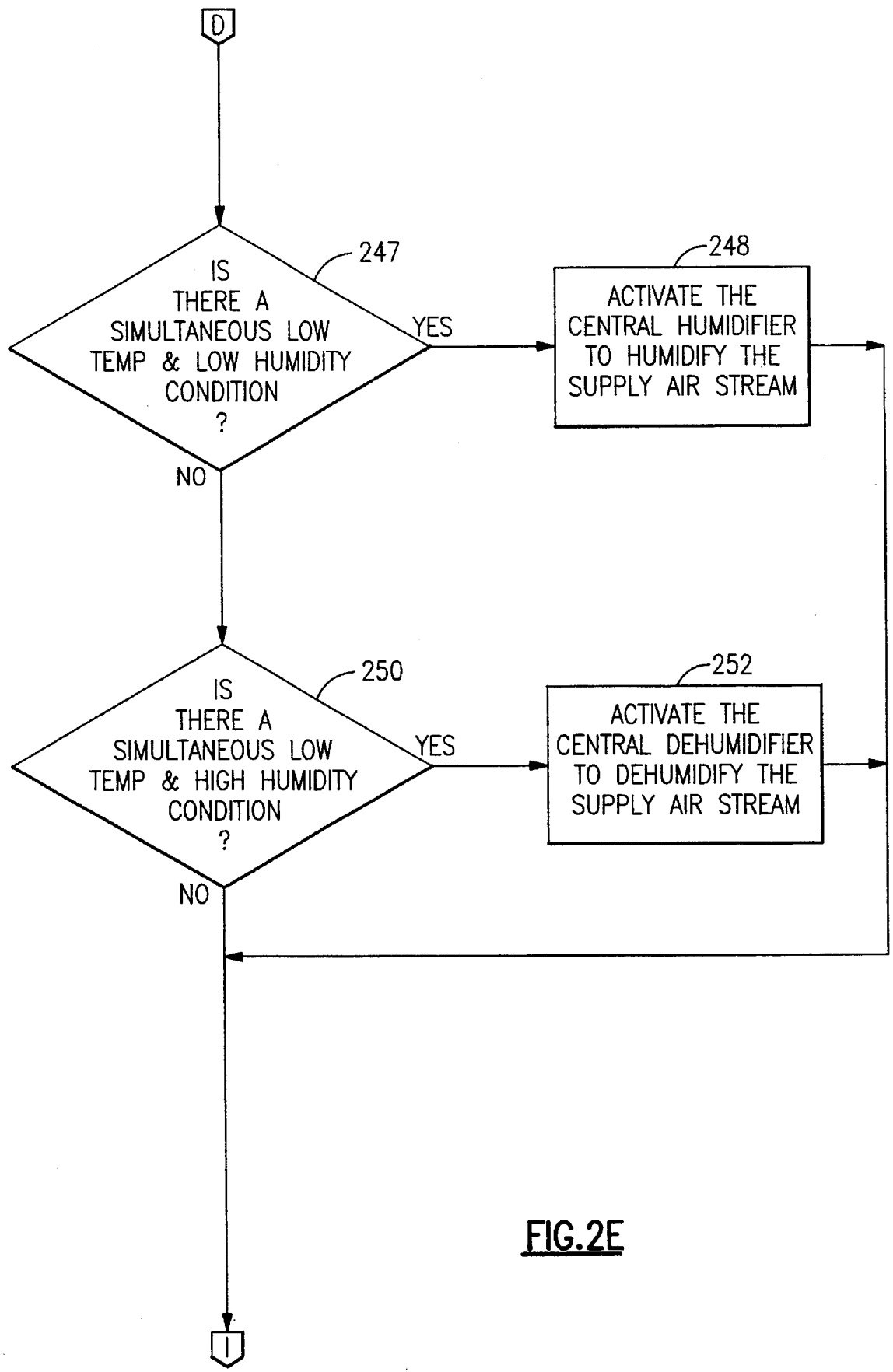
Figure 2F:
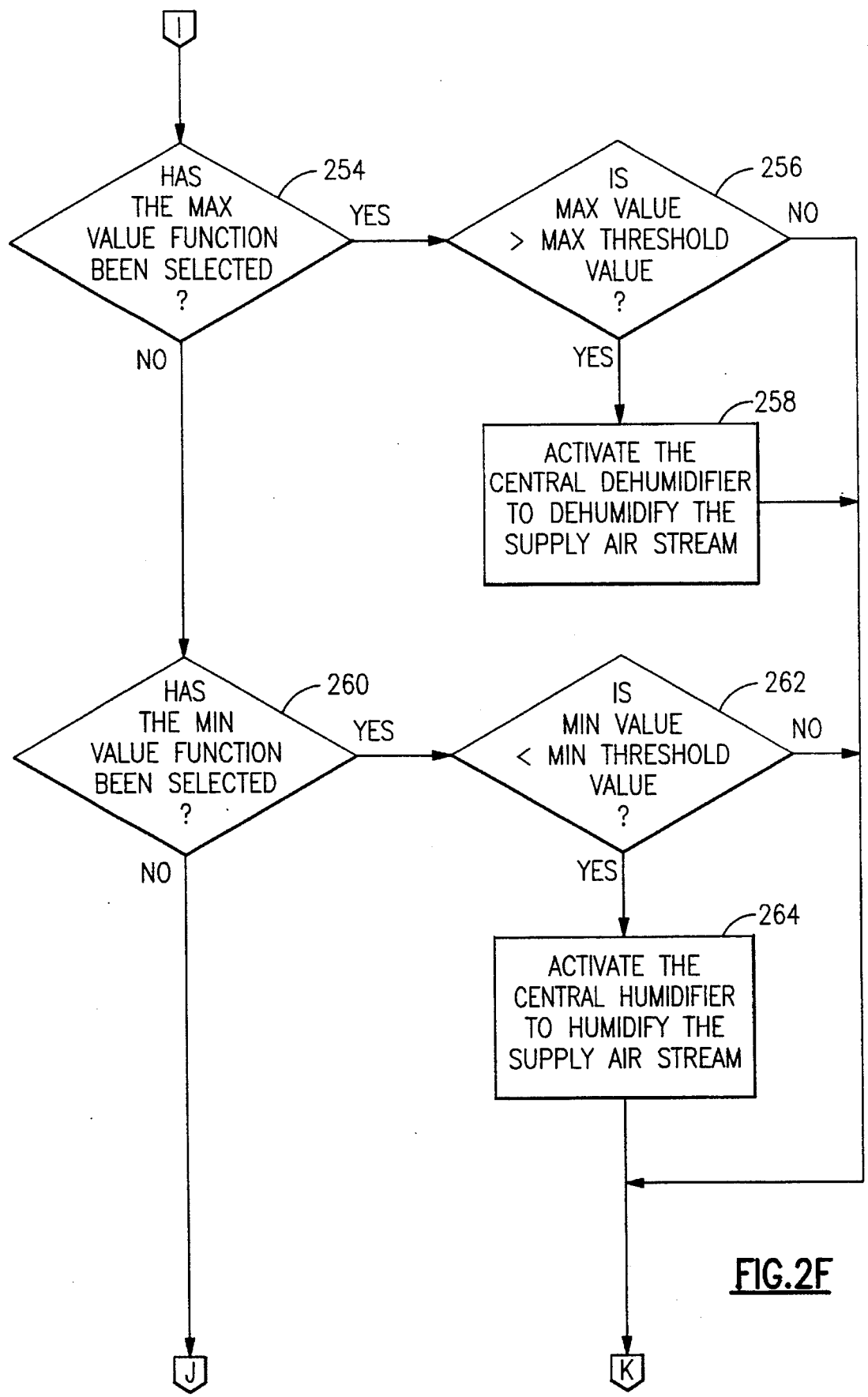
Figure 2G:
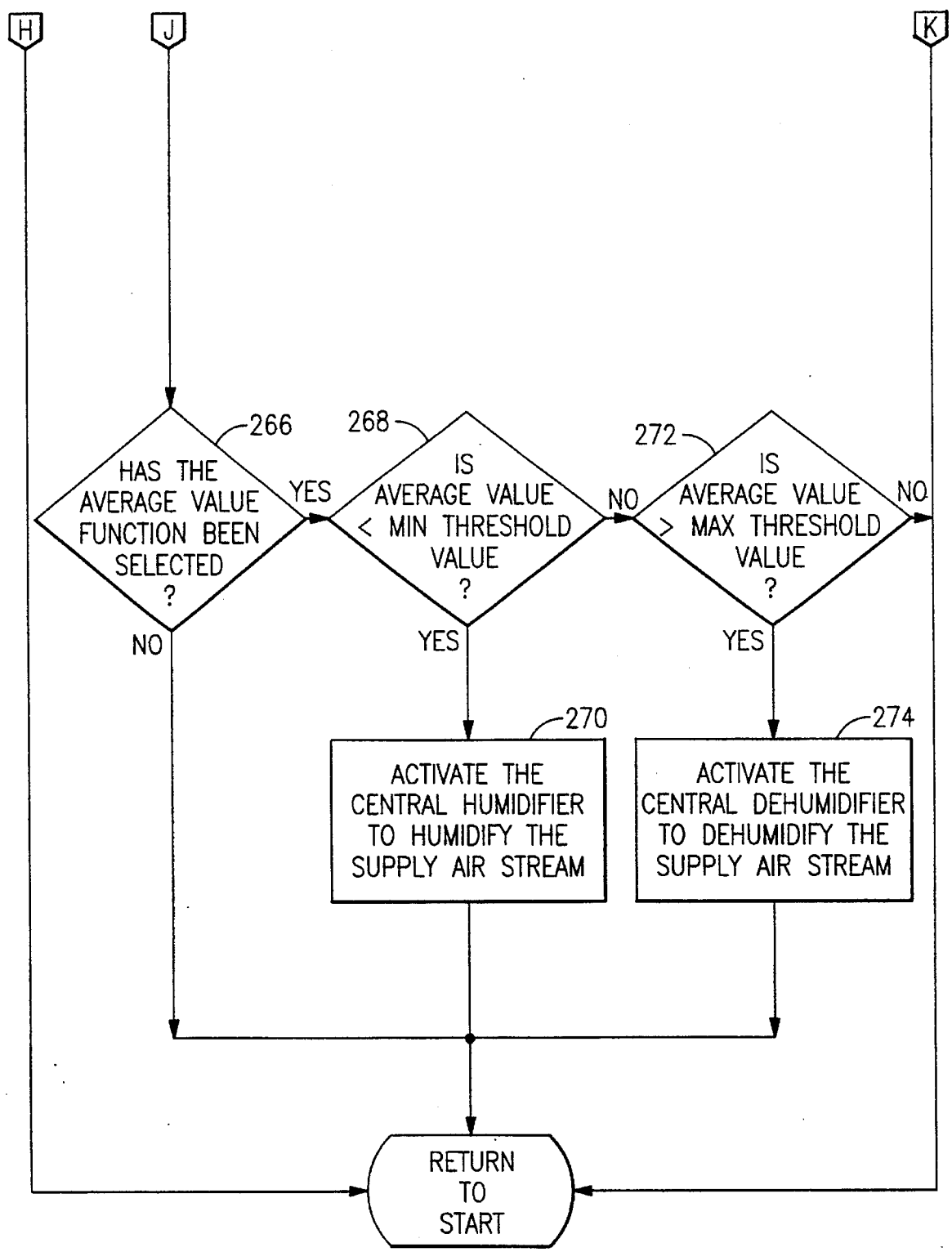

Referring initially to FIG. 1, there is illustrated a block diagram of an air quality control system for an indoor area divided into a plurality of zones, whereby air quality is controlled both centrally and at each of the zones. The central controller 101 provides air quality control of the supply air stream which flows to the zones. The central damper 103, which is modulated by the central controller 101, regulates a mixture of outside air and return air into the supply air stream. The supply air stream duct 105 provides a plurality of interconnected supply channels through which the supply air flows to the zones. The return air duct 107 provides a plurality of interconnected return channels through which the return air from each zone recirculates. The plurality of zone controllers 111, 113, and 115, each in communication with the central controller 101, provide air quality control for the plurality of zones. The plurality of zone dampers 121, 123 and 125, each appended to one of the supply channels and each modulated by the associated zone controller, individually regulate the flow of supply air into each zone. The plurality of air quality sensors 131, 133, and 135, one located in each zone and each continuously monitored by the associated zone controller, provide an air quality output value for each zone. The plurality of temperature sensors 141, 143, and 145, one located in each zone and each continuously monitored by the associated zone controller, provide a zone temperature for each zone. The central humidifier 151 and the central dehumidifier 153, which are controlled by the central controller 101, regulate the humidity of the supply air stream.

FIGS. 2A–2G comprise a flowchart illustrating the operation of the central controller in communication with the plurality of zone controllers. At step 202, the variables MAX VALUE, MIN VALUE, AVERAGE VALUE, SUM, and COUNTER are initialized to the value 0, and the variable ZONE NUMBER is initialized to the value 1. MAX VALUE represents the maximum air quality value from the plurality of zones. MIN VALUE represents the minimum air quality value from the plurality of zones. AVERAGE VALUE represents the average of the air quality values from the plurality of zones. SUM represents the sum total of all air quality values from the plurality of zones. COUNTER incrementally counts through every one of the plurality of zones until each zone air quality sensor has been read. Each of the plurality of zones is designated a zone number. The number of the zone currently being monitored for an air quality sensor reading is represented by ZONE NUMBER.

The air quality sensor value from zone number 1 is read at step 204. If the sensor value is valid at step 206, then control continues at step 208; if not, then ZONE NUMBER is incremented by one at step 224 and control returns to step 204 to read the air quality sensor at the next zone. If COUNTER has a value of 0 at step 208, control continues to step 210, where the sensor value is stored as MAX VALUE and MIN VALUE, the zone number is stored as MAX VALUE ZONE and MIN VALUE ZONE, and control jumps to step 220. If COUNTER does not have a value of 0 at step 208, control jumps to step 212.

At step 212, if the sensor value is greater than MAX VALUE, the current maximum sensor value from the plurality of zones, then the sensor value is stored as MAX VALUE at step 214, the zone number is stored as MAX VALUE ZONE and control jumps to step 220. If the sensor value is less than MAX VALUE, then control jumps to step 216. At step 216, if the sensor value is less than MIN VALUE, the current minimum sensor value from the plurality of zones, then the sensor value is stored as MIN VALUE at step 218, the zone number is stored as MIN VALUE ZONE, and control continues to step 220.

The sensor value of the current zone is added to the present sum total of zone air quality sensor values at step 220 and COUNTER is incremented by one. If the current zone is not the last zone of the plurality of zones at step 222, then ZONE NUMBER is incremented by one at step 224, and control loops back to step 204 to read the air quality sensor value from the next zone. If the current zone number is the last zone at step 222, then control jumps to step 226; if not, then ZONE NUMBER is incremented by one and control loops back to step 204 to read the air quality sensor value from the next zone.

At step 226, the average of the plurality of sensor values is computed by dividing SUM by COUNTER and storing the quotient as AVERAGE VALUE. The central air quality threshold maximum and minimum values are read at step 228. If the sensor value is a humidity reading at step 230 then control jumps to step 247; if not, then controls continue to step 232. If there is a simultaneous low temperature and above maximum threshold air quality condition in a zone at step 232, then the central damper is modulated to increase outside air flow into the supply air stream at step 233 and control continues at step 234. If there is not a simultaneous low temperature and above maximum threshold air quality condition at step 232 then control jumps to step 234. If there is a simultaneous high temperature and below minimum threshold air quality condition in a zone at step 234, then the central damper is modulated to decrease outside air flow into the supply air stream at step 235 and control continues at step 236. If there is not a simultaneous high temperature and below minimum threshold air quality condition at step 234 then control jumps to step 236.

If the maximum value function has been selected at step 236, then control continues at step 237; if not, then control jumps to step 239. If MAX VALUE is greater than the central maximum threshold value at step 237, then the central damper is modulated to increase outside air flow into the supply air stream at step 238. The control having completed one process iteration, loops back to the first step 202 to start the process again. If MAX VALUE is less than the central maximum threshold value at step 237, then no action is taken and the control, having completed one process iteration, loops back to the first step 202 to start the process again.

If the minimum value function has been selected at step 239, then control continues at step 240; if not, then control jumps to step 242. If MIN VALUE is less than the central minimum threshold value at step 240, then the central damper is modulated to decrease outside air flow into the supply air stream at step 241. The control having completed one process iteration, loops back to the first step 202 to start the process again. If MIN VALUE is greater than the central minimum threshold value at step 240, then no action is taken and the control, having completed one process iteration, loops back to the first step 202 to start the process again.

If the average value function has been selected at step 242, then control continues at step 243; if not, then the control, having completed one process iteration, loops back to the first step 202 to start the process again. If AVERAGE VALUE is less than the central minimum threshold value at step 243, then the central damper is modulated to decrease outside air flow into the supply air stream at step 244. The control, having completed one process iteration, loops back to the first step 202 to start the process again. If AVERAGE VALUE is greater than the central minimum threshold value at step 243, then control jumps to step 245. If AVERAGE VALUE is greater than the central maximum threshold value at step 245, then the central damper is modulated to increase outside air flow into the supply air stream at step 246. The control, having completed one process iteration, loops back to the first step 202 to start the process again. If AVERAGE VALUE is less than the central maximum threshold value at step 245, then no action is taken and the control having completed one process iteration, loops back to the first step 202 to start the process again.

If the sensor value is a humidity reading at step 230, then control jumps to step 247. If there is a simultaneous low temperature and low humidity condition at step 247, then the central humidifier is activated to humidify the supply air stream at step 248, and control jumps to step 254. If there is not a simultaneous low temperature and low humidity condition at step 247, then control jumps to step 250. If there is a simultaneous low temperature and high humidity condition at step 250, then the central dehumidifier is activated to dehumidify the supply air stream at step 252, and control continues to step 254. If there is not a simultaneous low temperature and high humidity condition at step 250, then control jumps to step 254.

If the maximum value function has been selected at step 254, then control continues to step 256; if not, then control jumps to step 260. If MAX VALUE is greater than the central maximum threshold value at step 256, then the central dehumidifier is activated to dehumidify the supply air stream at step 258 and the control, having completed one process iteration, loops back to the first step 202 to start the process again. If MAX VALUE is less than the central maximum threshold value at step 256, then no action is taken and the control, having completed one process iteration, loops back to the first step 202 to start the process again. If the minimum value function has been selected at step 260, then control continues to step 262; if not, control jumps to step 266. If MIN VALUE is less than the central minimum threshold value at step 262, then the central humidifier is activated to humidify the supply air stream at step 264, and the control, having completed one process iteration, loops back to the first step 202 to start the process again. If MIN VALUE is greater than the central minimum threshold value at step 262, then no action is taken and the control, having completed one process iteration, loops back to the first step 202 to start the process again.

If the average value function has been selected at step 266, then control continues at step 268; if not, then no action is taken and the control, having completed one process iteration, loops back to the first step 202 to start the process again. If AVERAGE VALUE is less than the central minimum threshold value at step 268, then the central humidifier is activated to humidify the supply air stream at step 270 and the control, having completed one process iteration, loops back to the first step 202 to start the process again. If AVERAGE VALUE is greater than the central minimum threshold value at step 268, then control continues to step 272. If AVERAGE VALUE is greater than the central maximum threshold value at step 272, then the central dehumidifier is activated to dehumidify the supply air stream at step 274 and the control, having completed one process iteration, loops back to the first step 202 to start the process again. If AVERAGE VALUE is less than the central maximum threshold value at step 272, then no action is taken and the control, having completed one process iteration, loops back to the first step 202 to start the process again.

While the invention has been described in the specification and illustrated in the drawings with reference to the preferred embodiments, it will be understood by those skilled in the art that various changes may be made and equivalence may be substituted for elements of the invention without departing from the scope of the claims. In addition, many modifications may be made to adapt a particular situation or material to the teachings of the invention without departing from the essential scope thereof. Therefore, it is intended that the invention not be limited to the particular embodiments illustrated by the drawings and described in the specification as the best mode presently contemplated for carrying out the invention, but that the invention will include any embodiments falling within the description of the appended claims.

What is claimed is:

1. A system for providing air quality control for an indoor area divided into a plurality of zones, whereby air quality is controlled both centrally and at each of the zones, including:

a central controller;

a central damper modulated by the central controller so as to regulate a mixture of outside air and return air into a supply air stream which flows to the zones;

a supply air stream duct for providing a plurality of interconnected supply channels through which the supply air flows to the zones;

a return air duct for providing a plurality of interconnected return channels through which the return air from each zone recirculates;

a plurality of zone dampers each appended to one of said supply channels for individually regulating the flow of supply air into each zone;

a plurality of air quality sensors, one located in each zone, for providing an air quality output value for each zone;

a plurality of temperature sensors, one located in each zone, for providing a zone temperature for each zone; and a plurality of zone controllers for controlling the zone dampers that regulate the flow of supply air to the respective zones, each of said zone controllers being in communication with a respective air quality sensor and a respective temperature sensor for a particular zone, each of said zone controllers furthermore being in communication with said central controller whereby said central controller receives the zone temperature and air quality value from each zone controller and is operative to modulate the central damper regulating the mixture of outside air and return air as a function of the received zone temperatures and air quality sensor values from the respective zones so as to thereby control the air quality of the supply air stream flowing to the zones.

2. The system of claim 1, further comprising:

a central humidifier controlled by the central controller for regulating a humidity of the supply air stream; and a central dehumidifier controlled by the central controller for regulating the humidity of the supply air stream.

3. A method for providing air quality control for an indoor area divided into a plurality of zones, whereby air quality is controlled both centrally and at each of the zones, including the steps of:

reading an output value of an air quality sensor from one of the zones;

comparing the output value with a zone maximum threshold value and a zone minimum threshold value;

modulating one of the plurality of zone dampers for increasing a supply air flow into the one zone when the output value is greater than the zone maximum threshold value;

modulating one of the plurality of zone dampers for decreasing the supply air flow into the one zone when the output value is less than the zone minimum threshold value;

repeating said steps of reading the output value, comparing the output value, and modulating the zone damper for each of the zones;

determining a predetermined function of the output values from all of the zones;

comparing the function of the output values with a central maximum threshold value and a central minimum threshold value;

modulating a central damper for increasing an outside air flow into the supply air stream when the function of the output values is greater than the central maximum threshold value; and modulating the central damper for decreasing the outside air flow into the supply air stream when the function of the output values is less than the central minimum threshold value.

4. The method of claim 3, wherein said step of modulating one of the zone dampers is performed for decreasing the supply air flow into the one zone when a zone temperature is below a zone minimum temperature threshold value; and said step of modulating the central damper is performed for increasing the flow of outside air into the supply air stream when the zone temperature is below the zone minimum temperature threshold value and the output value of the air quality sensor is greater than the zone maximum threshold value.

5. The method of claim 4, wherein said step of modulating one of the zone dampers is performed for increasing the supply air flow into the one zone when the zone temperature is above a zone maximum temperature threshold value; and said step of modulating the central damper is performed for decreasing the flow of outside air into the supply air stream when the zone temperature is above the zone maximum temperature threshold value and the output value of the air quality sensor is less than the zone minimum threshold value.

6. The method of claim 5, wherein the function of the output values is a maximum of the output values.

7. The method of claim 6, wherein the air quality sensor is a $CO_2$ sensor.

8. The method of claim 6, wherein the air quality sensor is a volatile organic compound sensor.

9. The method of claim 5, wherein the function of the output values is an average of the output values.

10. The method of claim 9, wherein the air quality sensor is a $CO_2$ sensor.

11. The method of claim 9, wherein the air quality sensor is a volatile organic compound sensor.

12. A method for providing humidity control for an indoor area divided into a plurality of zones, whereby humidity is controlled both centrally and at each of the zones, including the steps:

reading an output value of a humidity sensor from one of the zones;

comparing the output value with a zone minimum threshold value and a zone maximum threshold value;

modulating one of a plurality of zone dampers for increasing a supply air flow into the one zone when the output value is greater than the zone maximum threshold value;

modulating one of the plurality of zone dampers for decreasing the supply air flow into the one zone when the output value is less than the zone minimum threshold value;

repeating said steps of reading the output value, comparing the output value, and modulating the zone damper for each of the zones;

determining a predetermined function of the output values from all of the zones;

comparing the function of the output values with a central minimum threshold value and a central maximum threshold value;

regulating a central humidifier for increasing the humidity of the supply air stream when the function of the output values is less than the central minimum threshold value; and regulating a central dehumidifier for decreasing the humidity of the supply air stream when the function of the output values is greater than the central maximum threshold value.

13. The method of claim 12, wherein the function of the output values is a minimum of the output values.

14. The method of claim 12, wherein the function of the output values is a maximum of the output values.

15. The method of claim 12, wherein the function of the output values is an average of the output values.

* * * * *